US006187255B1

(12) United States Patent
Greulich

(10) Patent No.: US 6,187,255 B1
(45) Date of Patent: Feb. 13, 2001

(54) METHOD FOR PRODUCING BUILDING MATERIALS

(75) Inventor: Norbert Greulich, Mainz (DE)

(73) Assignee: Indupart Glaskeramic Stahl - Und Metallbau GmbH, Teuschenthal (DE)

( * ) Notice: Under 35 U.S.C. 154(b), the term of this patent shall be extended for 0 days.

(21) Appl. No.: 09/529,138

(22) PCT Filed: Oct. 2, 1998

(86) PCT No.: PCT/EP98/06288

§ 371 Date: Jun. 5, 2000

§ 102(e) Date: Jun. 5, 2000

(87) PCT Pub. No.: WO99/19264

PCT Pub. Date: Apr. 22, 1999

(30) Foreign Application Priority Data

Oct. 11, 1997 (DE) ............................................. 197 45 045

(51) Int. Cl.[7] .................................................... C04B 33/32

(52) U.S. Cl. .......................... 264/642; 264/660; 264/122; 264/125

(58) Field of Search .................................... 264/642, 122, 264/125, 660

(56) References Cited

U.S. PATENT DOCUMENTS 5,911,941 * 6/1999 Rokhvarger et al. ................ 264/432

FOREIGN PATENT DOCUMENTS 43 19 808 C1 7/1994 (DE) .
44 16 489 11/1995 (DE) .
44 16 489 C1 11/1995 (DE) .
91 03433 3/1991 (WO) .

OTHER PUBLICATIONS

Database WPI, Section CH, Week 7405, Derwent Publication LTD, London, Class L02, An 74–08925V, XP0020990095 & SU 383 692, Aug. 1, 1973.

* cited by examiner

*Primary Examiner*—Christopher A. Fiorilla
(74) *Attorney, Agent, or Firm*—Michael J. Striker

(57) ABSTRACT

The invention relates to a process for producing high-strength construction and decoration materials which resemble natural stone, are in the form of panels and are used for cladding facades, walls and floors, both indoors and outdoors, from mixtures of broken glass, mineral components and finely divided additives, with a specified composition. A sintering aid, in the form of a solution of metal oxychlorides or metal alkoxides or tetrachlorides, preferably titanium tetrachloride, is added to the mixture, which is then introduced into a heat-resistant mould. In this mould, the mixture is subjected to a conventional sintering operation. The sintering aid which has been added makes it possible in particular to reduce the maximum sintering temperature and to improve the quality of the surface considerably.

8 Claims, No Drawings

METHOD FOR PRODUCING BUILDING MATERIALS

This application is a 371 of PCT/EP 98/06288 filed Oct. 2, 1998.

BACKGROUND OF THE INVENTION

1. Field of the Invention

The invention relates to a process for producing shaped sintered glass or sintered glass ceramic bodies and, more particularly, to a process for producing shaped sintered glass or sintered glass-ceramic bodies as high-strength construction and decoration materials simulating natural stone and used for cladding facades, walls and floors, both indoors and outdoors, that includes introducing a planar, uniformly thick layer of a mixture of broken glass, a mineral component and finely divided additives into a heat-resistant mold and drying it at a temperature of 60 to 100° C.; heating the layer at a rate of at least 0.5 to 3.0 K/min to a sintering temperature; maintaining the sintering temperature for at least 20 minutes and then cooling the layer at a rate of at least 0.5 to 3.0 K/min to room temperature.

2. Prior Art

Numerous natural materials are employed for decorative applications both indoors and outdoors. Marble and granite are particularly widely used and are employed in large quantities for the internal and external cladding of prestige buildings. In addition to providing the decorative impression, it is also imperative that the corrosion resistance and economic production be assured. Naturally occurring materials do not always fulfil these demands, since it is often impossible to produce sufficiently large surfaces which have a uniform impression and since the corrosion resistance and strength are not always optimal, owing to the porosity of the natural material.

It is therefore known to replace the natural materials with artificially produced, glass-based shaped bodies which resemble natural stone and are in the form of panels.

For example, DE 41 25 698 C1 has disclosed a glass ceramic material having a composition (in % by weight, based on oxide) of

| | |
|---|---|
| $SiO_2$ | 64.1–72 |
| $Al_2O_3$ | 2.9–11 |
| CaO | 15.0–26 |
| MgO | 0–8 |
| ZnO | 0 ≦ 2 |
| BaO | 0–0.5 |
| $K_2O$ | 0–7.4 |
| $Na_2O$ | 0–2 |
| F | 0.5–4 |

where Σ $Na_2O$, $K_2O$ is at least 2, which material is used to replace natural stone for decorative applications and to cover floors and clad walls and facades in the construction industry.

Although glass ceramic offers an excellent decorative appearance as a replacement for natural stone, it is complex and expensive to produce, partly, for example, as a result of the complex process required to make it ceramic. Furthermore, relatively pure, and hence expensive, raw materials are required for its production.

Therefore, DE 43 19 808 C1 and DE 44 16 489 C1 have also disclosed the production of shaped bodies which resemble natural stone of the type mentioned above which are based on sintered glass or sintered glass ceramic. The starting material used for these sintering production processes is broken glass. The broken glass may be granulated glass made from flat glass and/or hollow ware, e.g. from bottles or containers, and mixtures thereof, with the possibility of also using some ecology cullet, recycled glass, e.g. from screen tubes, and glass remainders. Shaped sintered glass or sintered glass ceramic bodies produced from glass granules of this nature together with additives can therefore be produced cost-effectively and in an environmentally friendly manner.

For example, DE 43 19 808 C1 describes a process for producing high-strength construction and decoration materials which resemble natural stone, are in the form of panels and are used for cladding facades, walls and floors both indoors and outdoors, which materials comprise laminated individual layers of broken glass, additives, in particular sand, and mixtures thereof. In this known method, firstly a compressed stack of individual layers of the starting materials is built up in a heat-resistant mould, and this stack of layers is then subjected to a heat treatment which comprises a plurality of successive process steps.

Owing to the need to build up a multilayered stack and the resultant extensive heat treatment, producing the shaped bodies using this process is extremely complex.

By contrast, DE 44 16 489 C1 describes a less complex process for producing high-strength construction and decoration materials which resemble natural stone, are in the form of panels and are used for cladding facades, walls and floors both indoors and outdoors, in which the starting material comprises a mixture of broken glass, mineral components and finely divided additives, the mixture being produced from 85–98% by mass of broken glass, 0–14.7% by mass of a mineral component and a total of 0.3–5% by mass of finely divided additives. This mixture is then introduced, in a single planar, uniformly thick layer, into a heat-resistant mould, where it is dried at 60–110° C. then heated at a rate of 0.5–3.0 K/min to 720–1100° C., this temperature being held for 20–120 min. The layer is then cooled at a rate of 0.5–3.0 K/min to room temperature.

The abovementioned composition of the mixture and the temperature profile indicated ensure that the shaped bodies

- do not react with the production mould
- there is no unevenness on the panel surface
- the panels are not deformed
- no bubbles, pores, inclusions and/or microcracks are formed in the top layer
- there is no need for any grinding and polishing work, and
- have a high tensile bending strength.

The advantages of the construction and decoration materials which are produced using the known process are that:

1. The tensile bending strength is at least 14–18 MPa, and if $ZrO_2$ is used even reaches 19–23 MPa.
2. There are no microcracks on the surface, so that a Class 1 speck resistance in accordance with DIN EN 122 is achieved.
3. The appearance of different panels is more uniform and hence more reproducible than that of panels which are manufactured without the additives according to the invention and which, despite the manufacturing parameters being unchanged, often have entirely different appearances.
4. The "elegant charm" of the panel surface is considerably more lifelike and strongly resembles specific types of natural stone, e.g. granite.
5. The colours and structures of the material surfaces can be configured as desired.

6. An independent, tasteful appearance is reproducible.
7. The material has very few bubbles in the interior (otherwise, bubbles would have an adverse effect on any surface polishing).
8. The use of recycled glass materials preserves stocks of natural stone and thus makes the above process ecologically advantageous as well.

The construction and decoration materials which resemble natural stone and are produced using the known process are highly durable and have a long service life. They are used for claddings for external and internal walls of structures produced in industrial, residential and traffic construction engineering, for furniture, work surfaces in kitchens and laboratories and for decorative works of art. The materials are distinguished by a high strength and hardness. The material is hygienic, easy to clean, withstands high temperatures, is chemically resistant, electrically nonconductive and is not combustible. The synthetic construction and decoration materials produced in this way are therefore better than natural, expensive materials, such as for example granite, marble or travertine.

SUMMARY OF THE INVENTION

The invention is based on this known method in accordance with DE 44 16 489 C1.

The invention is based on the object of producing sintered glass or sintered glass ceramic panels using this process which have a visually effective surface quality as can otherwise only be produced by expensive and technically complex grinding and polishing operations. A further object is to reduce the maximum temperature for the sintering operation.

According to the invention, this object is achieved by the fact that, starting from the process described at the outset, a sintering aid, in the form of a solution of a metal tetrachloride compound, a metal oxychloride, a metal alkoxide or a hydrolysis product is added to the mixtures.

The measure according to the invention resides in the surprising effect that the sintering temperature can be reduced by up to 130 K by using even small quantities of dissolved compounds mentioned above, advantageously leading to savings on energy costs and thus making the entire process more economical and technically simpler. The use properties, such as for example the strength, remain unchanged or may even be improved with regard to the surface quality and the possibility of deforming and bending the shaped bodies, which are in the form of panels. Thus it has been found, for example, that panels made from sintered glass ceramic which have been produced, for example, with the aid of a tetrachloride additive, in contrast to panels which have been produced without this additive, can be deformed, in particular bent, without problems at 700° C., which is highly advantageous.

The abovementioned additives increase the sintering activity of the glass granules used. An indicator of this is an improved smooth flow of the glass, as manifested by an increase in the gloss and improvement to the planarity of the panel surfaces produced. According to the tests which have been carried out so far, this even allows relatively coarse glass granules, with grain size upper limits of up to 10 mm (previous standard grains: <5 m) to be used for production according to the process of the invention without adversely affecting the tensile bending strength.

It has been found that various metal tetrachloride compounds or metal oxychlorides or metal alkoxides, or the hydrolysis products thereof, can be used. Particular importance is attached to compounds containing metals of subgroups 4 and 5 of the periodic system and tin, such as tetrachloride compounds or oxychlorides or alkoxides of tin, of vanadium or of zirconium or hydrolysis products thereof.

Titanium tetrachloride ($TiCl_4$) is preferably used, since tests have shown that this compound provides a particularly marked effect.

In principle, the solution may be an aqueous solution. However, it has been found that the abovementioned additives, in particular titanium tetrachloride, are particularly effective as sintering aids if they are added when dissolved in ethanol or other alcohols.

In this context, the word solution is also taken to mean a suspension and a colloidal system.

The metal alkoxides may be added as such in solution. They may also be formed only in the alcoholic solution by the metal reacting therein.

The additives make up from 80 to 600 ppm of the total batch. By way of example, a significant reduction in the maximum sintering temperature required can be observed even with a low level of added tetrachloride within the range from 80–250 ppm, preferably in the vicinity of 160 ppm. The sintering temperature for large-area panels can be reduced from 990° C. to 900° C. without having any adverse effect on the strength of the material.

The gloss and planarity of the surface of the panels produced in this way approach the quality of polished surfaces.

A visible effect occurs even with a $TiCl_4$ addition of 160 ppm, the $TiCl_4$ advantageously being introduced in dissolved form.

Additives, in particular tetrachloride additives >400 ppm, make it possible to produce panels with a completely planar yet obscured surface, which otherwise can only be achieved by means of a further process step, such as sand-blasting or grinding.

The abovementioned smooth flow of sintered glass materials is produced by the corresponding dioxides of the abovementioned additives, which dioxides is [sic] formed by decomposition of the added compounds, in particular of the tetrachlorides, in some cases at the sintering temperature. Clearly, this is only dependent on the dioxide formed being distributed in a sufficiently finely divided and uniform manner on the surface of the glass grains, and this is achieved via the route of dissolving the additives in a suitable solvent. The effect is particularly pronounced in the case of $TiO_2$ which is formed from components which have been dissolved in any way whatsoever. If the $TiCl_4$ is dissolved, for example, in water, $TiO_2$ is formed and at the same time finely distributed. If it is dissolved in alcohol, it is finely distributed and is only formed as a result of sintering.

The tetrachlorides listed above, namely of tin, vanadium, zirconium and titanium, in principle cannot be dissolved in water, since they are immediately hydrolyzed. This hydrolysis also takes place in an alcohol/water mixture. By way of example, when $TiCl_4$ is hydrolyzed, a water-containing compound $TiO_2.H_2O$ (previously also known as metatitanic acid, $H_2TiO_3$) is formed. As far as it has been possible to establish given current knowledge, partially or completely hydrolyzed reaction products formed from the reaction of the halogen compounds of the additives generally represent the substance which is actually active in the effect described. For this reason, it is also possible to use other compounds which hydrolyze in a similar manner to alcohol or water, e.g.

titanium oxysulphate TiO $(SO_4)$, previously also known as titanyl sulphate. Therefore, solutions which are formed from the reaction of water with organic titanium compounds of the general formula $Ti(OR)_4$ are also suitable. These titanium alkoxides which contain alkyl radicals of up to about four carbon atoms also hydrolyze more or less rapidly, initially forming oligomers, to give the end product $TiO_2$, which, as described, is ascribed particular importance. Such titanium alkoxides or suitably halogenated titanium alkoxides of the general formula $Ti(OR)_nX_m$, where X=halogen and $m \leqq n$, are therefore also suitable.

Although the abovementioned DE 44 16 489 C also describes SnO or $TiO_2$ as finely divided additives, these additives are not added in dissolved, i.e. impregnatable, form and therefore cannot act as sintering aids in the sense of the invention.

The effect of the additive according to the invention consists in a very considerably improved planarity of the panel surface, combined with a significantly improved gloss. Consequently, in principle it is possible to use glass granules with grain size upper limits of up to at least 10 mm, which would otherwise lead to surfaces with excessive unevenness and hence to problems in grinding and polishing.

With a high level of added tetrachloride (>400 ppm) it is evident that too many oxide particles will be deposited in the surface of the grains, which particles again impair the sintering activity and hence the gloss. The panel surface becomes rougher, but its improved planarity is retained. The panel surfaces then have the attractive appearance of a ground or sandblasted material.

The sintered glass or sintered glass ceramic panels according to the invention are produced in accordance with the process steps described in DE 44 16 489 and the examples described therein.

After the homogenized and compacted mixtures have been placed in the heat-resistant moulds with the addition, according to the invention, of an ethanolic tetrachloride solution as sintering aid, the heat treatment begins with drying in the mould at temperatures of between 60 and 110° C. This is followed by the conventional sintering process steps which are known per se in the glass and ceramic industry, are explained in the abovementioned DE document in process steps 1.3–1.5 and are also incorporated in the present application. However, the measure according to the invention makes it possible to reduce the maximum sintering temperature of 990° K. by up to 130 K, resulting in the advantages described at the outset.

If the abovementioned DE document makes statements relating to the composition of glass materials, the grain size of the glass granules used, the added mineral components and the finely divided additives, this information is also incorporated in the disclosure of the present application.

The results of laboratory samples given in Tables 1 and 2 are intended to illustrate on a comparative basis certain properties of the sintered panels produced using the process according to the invention.

Table 1 summarizes, on a comparative basis, the results of tests relating to the optimization of the surfaces of the sintered panels produced using the process in accordance with the embodiment of the invention where the sintering aid employed is the titanium tetrachloride solution. In this table, the quantities of titanium dioxide formed from titanium tetrachloride during sintering, which quantities are equivalent to the titanium tetrachloride added, are shown for three maximum sintering temperatures Tmax.

The table shows that even at the relatively low maximum sintering temperature of 860° C., a titanium dioxide content of 35–110 ppm makes it possible to produce a smooth, planar panel with a satin-glazed sheen, while at the higher sintering temperature of 900° C. the surface has a satin-glazed gloss. A titanium dioxide content of 70 ppm corresponds to a titanium tetrachloride content of 160 ppm.

Table 2 shows a comparison between the tensile bending strength of a sintered panel produced using the abovementioned process according to the invention with and without an addition of 160 ppm of titanium tetrachloride, or 70 ppm of titanium dioxide.

The sintered panel tested was produced in a hearth car furnace at a maximum sintering temperature of 900° C., with a holding time of 60 minutes at this temperature. Compared to a panel produced under otherwise identical parameters but at Tmax=990° C. with a holding time of 120 minutes, the planarity and gloss of the surface was significantly improved. Comparing the Weibull distribution analysis for the tensile bending strength in the context of the measurement accuracy reveals no change from the reference sample, as shown by the comparison presented in Table 2, which moreover contains information for two different grain sizes and different sizes of the panel.

The abovementioned Table 2 in particular shows that the process according to the invention maintains the mechanical property values even with a reduced maximum sintering temperature and a holding time which has been reduced by half.

TABLE 1

| T max | | $TiO_2$ content [ppm] | | | | | | |
|---|---|---|---|---|---|---|---|---|
| [° C.] | | 0 | 35 | 70 | 110 | 140 | 180 | 210 |
| 860 | Surface: | — | smooth, planar | smooth, planar | smooth, planar | slightly rough, planar | slightly rough, planar | slightly rough, planar |
| | Gloss: | — | satin glaze | satin glaze | satin glaze | matt/satin glaze | matt/satin glaze | matt/satin glaze |
| 880 | Surface: | smooth, corrugated | smooth, planar | slightly rough, planar | smooth, planar | smooth, planar | smooth, planar | slightly rough, planar |
| | Gloss: | satin glaze | satin glaze | satin glaze | satin glaze | satin glaze | satin glaze | satin glaze |
| 900 | Surface: | smooth, corrugated | smooth, planar | smooth, planar | smooth, planar | smooth, planar | smooth, planar | smooth, planar |
| | Gloss: | satin | glossy/ | glossy | glossy/ | glossy/ | glossy/ | glossy/ |

TABLE 1-continued

| T max [° C.] | TiO$_2$ content [ppm] | | | | | | |
| --- | --- | --- | --- | --- | --- | --- | --- |
| | 0 | 35 | 70 | 110 | 140 | 180 | 210 |
| | glaze | satin glaze | | satin glaze | satin glaze | satin glaze | satin glaze |

TABLE 2

| | Panel containing 70 ppm TiO$_2$ Grain size < 5 mm Format 1200 × 900 mm | Panel containing 70 ppm TiO$_2$ Grain size < 10 mm Format 300 × 300 mm | Panel without TiO$_2$ |
| --- | --- | --- | --- |
| Charact. value [MPa] | 38 | 40 | 41 |
| Weibull's modulus | 13 | 12 | 5 |
| 5% quantile [MPa] | 30 | 31 | 30 |
| Sample number | 6 | 8 | 10 |

What is claimed is:

1. A process for producing a shaped sintered glass or sintered glass-ceramic body as a high-strength construction and decoration material simulating natural stone and used for cladding facades, walls and floors, both indoors and outdoors, said process comprising the steps of:

a) introducing a planar, uniformly thick layer of a mixture comprising from 85 to 98% by weight of broken glass, from 0 to 14.7% by weight of a mineral component and from 0.3 to 5% by weight of finely divided additives into a heat-resistant mold;

b) adding from 40 to 600 ppm of a sintering aid to the mixture, wherein said sintering aid is a solution of a metal tetrachloride compound, a metal oxychloride, a metal alkoxide, or a hydrolysis product thereof;

c) drying the layer of the mixture in the mold at a temperature of 60 to 100° C.;

d) heating the layer of the mixture at a rate of at least 0.5 to 3.0 K/min to a sintering temperature;

e) maintaining the layer of the mixture at said sintering temperature for at least 20 minutes; and then f) cooling the layer of the mixture at a rate of at least 0.5 to 3.0 K/min to room temperature.

2. The process as defined in claim 1, wherein said mixture contains about 70 ppm of said sintering aid.

3. The process as defined in claim 1, wherein said metal tetrachloride compound, said metal oxychloride, said metal alkoxide, or said hydrolysis product thereof, is formed from a metal from subgroup 4 or 5 of the periodic system of elements, or from tin.

4. The process as defined in claim 1, wherein said metal tetrachloride compound is tin tetrachloride, vanadium tetrachloride, zirconium tetrachloride or titanium tetrachloride, said metal oxychloride is tin oxychloride, vanadium oxychloride, zirconium oxychloride or titanium oxychloride; and said metal alkoxide is a tin alkoxide, a vanadium alkoxide, a zirconium alkoxide or a titanium alkoxide.

5. The process as defined in claim 1, wherein said metal tetrachloride compound is titanium tetrachloride, said metal oxychloride is titanium oxychloride and said metal alkoxide is a titanium alkoxide.

6. The process as defined in claim 1, wherein the solution is an aqueous or alcoholic solution.

7. The process as defined in claim 6, wherein said alcoholic solution is an ethanolic solution.

8. The process as defined in claim 1, wherein the broken glass in the mixture is a granulate having a grain size with a grain size upper limit in the vicinity of 10 mm.

* * * * *